United States Patent
Lee

(10) Patent No.: US 10,836,128 B2
(45) Date of Patent: Nov. 17, 2020

(54) AIR VALVE COMBINING TYPED POLYURETHANE FOAM EJECTION DEVICE FOR TIRE

(71) Applicant: HANKOOK TIRE CO., LTD., Seoul (KR)

(72) Inventor: Dae-Keun Lee, Chungcheongbuk-do (KR)

(73) Assignee: HANKOOK TIRE CO., LTD., Seoul (KR)

( * ) Notice: Subject to any disclaimer, the term of this patent is extended or adjusted under 35 U.S.C. 154(b) by 45 days.

(21) Appl. No.: 15/482,298

(22) Filed: Apr. 7, 2017

(65) Prior Publication Data

US 2017/0341324 A1   Nov. 30, 2017

(30) Foreign Application Priority Data

May 24, 2016 (KR) .......................... 10-2016-0063609

(51) Int. Cl.

| | |
|---|---|
| *B29D 30/06* | (2006.01) |
| *B60C 29/06* | (2006.01) |
| *B05B 15/65* | (2018.01) |
| *B05B 1/26* | (2006.01) |
| *B05B 7/00* | (2006.01) |
| *B29D 30/00* | (2006.01) |

(Continued)

(52) U.S. Cl.
CPC .......... *B29D 30/0681* (2013.01); *B05B 1/267* (2013.01); *B05B 7/0025* (2013.01); *B05B 15/65* (2018.02); *B29D 30/0061* (2013.01); *B60C 5/14* (2013.01); *B60C 19/002* (2013.01); *B60C 29/062* (2013.01); *F16K 15/20* (2013.01); *B05B 13/06* (2013.01); *B29C 73/166* (2013.01); *B29D 2030/0682* (2013.01); *B60C 5/002* (2013.01)

(58) Field of Classification Search
None
See application file for complete search history.

(56) References Cited

U.S. PATENT DOCUMENTS 3,942,573 A * 3/1976 Lawrence ............. B29C 73/166
                                                                152/503
4,054,168 A * 10/1977 Beers ..................... B60C 17/04
                                                                152/520

(Continued)

FOREIGN PATENT DOCUMENTS

| JP | 2008246868 A | 10/2008 |
|---|---|---|
| KR | 100971729 B1 | 7/2010 |

OTHER PUBLICATIONS

Office Action dated May 17, 2017 issued in KR 10-2016-0063609 with English translation, 15 pages.

*Primary Examiner* — Binu Thomas
(74) *Attorney, Agent, or Firm* — Novick, Kim & Lee, PLLC; Jae Youn Kim; Jihun Kim

(57) ABSTRACT

An embodiment of the present invention provides an air injection valve-integrated spray for spraying and applying polyurethane foam to a desired portion of a tire. The spray includes a polyurethane foam chamber disposed at an end of a coupling portion and keeping polyurethane foam under pressure and an air delivery chamber delivering air injected from an air injection valve to a breaking portion of the polyurethane foam chamber, in which the breaking portion of the polyurethane foam chamber is broken by air coming out of the air delivery chamber, so the polyurethane foam is sprayed.

10 Claims, 6 Drawing Sheets

(51) Int. Cl.
*B60C 5/14* (2006.01)
*B60C 19/00* (2006.01)
*F16K 15/20* (2006.01)
B60C 5/00 (2006.01)
B05B 13/06 (2006.01)
B29C 73/16 (2006.01)

(56) References Cited

U.S. PATENT DOCUMENTS

| | | | | |
|---|---|---|---|---|
| 2011/0290372 A1* | 12/2011 | Dowel | ............... | B29C 73/166 |
| | | | | 141/37 |
| 2014/0113072 A1* | 4/2014 | Meyer | ............... | B60C 29/062 |
| | | | | 427/230 |
| 2015/0132478 A1* | 5/2015 | Marszalek | ............ | B60C 29/062 |
| | | | | 427/157 |
| 2016/0108299 A1* | 4/2016 | Okamatsu | ............. | B29C 73/163 |
| | | | | 264/36.14 |

* cited by examiner

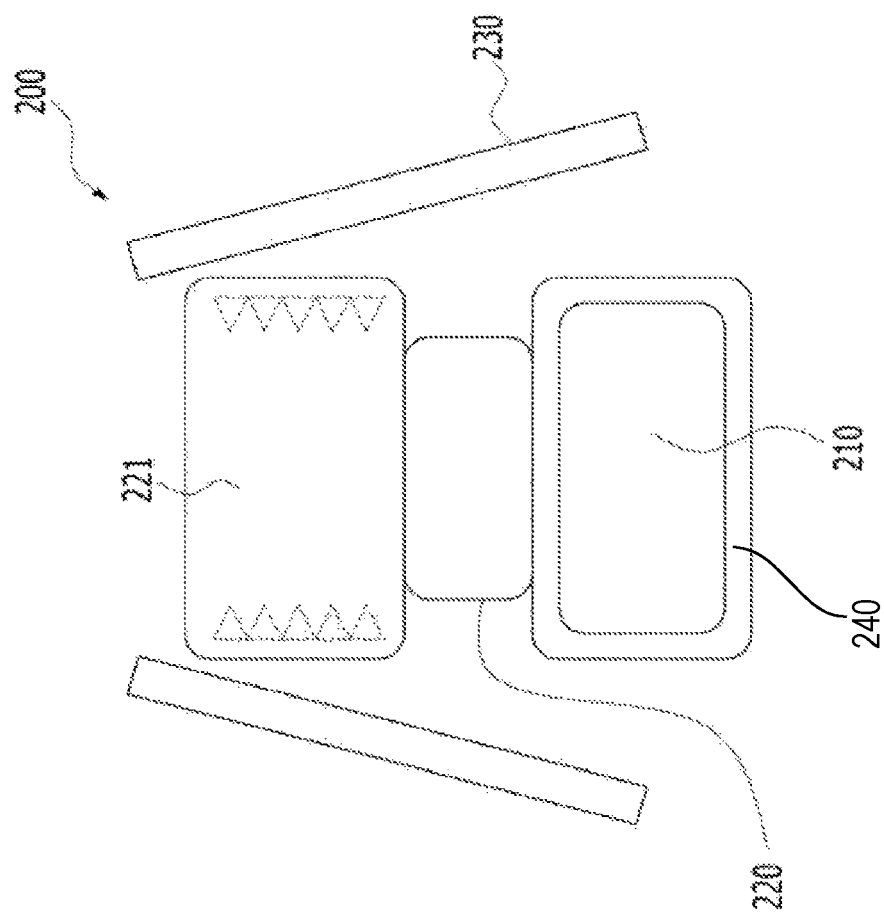

AIR VALVE COMBINING TYPED POLYURETHANE FOAM EJECTION DEVICE FOR TIRE

CROSS-REFERENCE TO RELATED APPLICATION

This application claims priority to and the benefit of Korean Patent Application No. 10-2016-0063609, filed on May 24, 2016, the disclosure of which is incorporated herein by reference in its entirety.

BACKGROUND OF THE INVENTION

Field of the Invention

The present invention relates to an air injection valve-integrated spray for spraying polyurethane foam for a tire, whereby it applies polyurethane foam to a predetermined portion of a tire. More particularly, it relates to an air injection valve-integrated spray for spraying polyurethane foam for a tire, the spray being able to easily apply polyurethane foam to the inner liner of a tire by spraying polyurethane foam from a polyurethane foam chamber when air is injected from an air injection valve.

Description of the Related Art

Recently, studies for improving the performance of tires have been actively conducted with improvement in power performance of vehicles. A tire is an important part only which of automotive parts comes in contact with the ground and has large influence on power transmission, steering, fuel efficiency, and braking performance of a vehicle. A tire is in close connection with noise and vibration that are generated during driving, other than the basic power performance. In particular, the main factor of road noise that is generated in a low-frequency range of 200-250 Hz is cavity noise due to rotation of a tire and an efficient method of reducing the cavity noise is to directly remove cavity noise from a tire. Since tires are combined with a wheel and then mounted on a vehicle, a tire and a wheel make one closed structure, which is filled with air at high pressure of 30-40 psi. Such a high-pressure closed tire is rotated by engine power and cavity noise is generated by the high-speed rotation. Recently, tires to which polyurethane foam is applied using a double-sided table and a toluene-based primer have been manufactured. A material obtained by machining polyurethane (PU) is representative of acoustic absorbents that are generally used for tires.

A device for attaching an acoustic absorbent to a tire has been disclosed in Korean Patent No. 10-0971729 (titled, "Device of attaching acoustic absorbent on tire, hereafter, referred to as Patent Document 1) and the device includes a rotary table on which a tire is rotatably fixed, a conveyer continuously conveys acoustic absorbents having an adhesive on one side to the rotary table, a guide rails disposed between the rotary table and the conveyer to guide the acoustic absorbents from the conveyer into tires, and a pressing unit pressing the acoustic absorbents guided into the tires to attach them to the inner sides of the tires.

CITATION LIST

Patent Literature

Patent Literature 1: Korean Patent No. 10-0971729

SUMMARY OF THE INVENTION

According to Patent Document 1, there is a problem in that it may be inefficient because an acoustic absorbent is attached to the inner side of a tire through complicated device and process.

The technical subjects to implement in the present invention are not limited to the technical problems described above and other technical subjects that are not stated herein will be clearly understood by those skilled in the art from the following specifications.

In order to achieve the objects of the present invention, an aspect of the present invention provides an air injection valve-integrated spray for spraying and applying polyurethane foam to a desired portion of a tire. The spray includes a polyurethane foam chamber disposed at an end of a coupling portion and keeping polyurethane foam under pressure and an air delivery chamber delivering air injected from an air injection valve to a breaking portion of the polyurethane foam chamber, in which the breaking portion of the polyurethane foam chamber is broken by air coming out of the air delivery chamber, so the polyurethane foam is sprayed.

The spray may further include a spray guide, in which the spray guide may allow the polyurethane foam to be applied to a predetermined portion of the tire.

The predetermined portion to which the polyurethane foam is applied may be the inner liner of the tire.

The air delivery chamber may have a coupling portion for coupling to the air injection valve.

The coupling portion may be a thread and the thread may correspond to a thread on the air injection valve.

The air delivery chamber may be formed in a tube shape.

The air delivery chamber may have a seat, where the polyurethane foam chamber is seated, at an end of the tube shape.

The spray guide may be composed of one or more plates, the plates may have a first end coupled and fixed to the polyurethane foam chamber or the air delivery chamber and a second end as a free end, and the plates may maintain a position for guiding the sprayed and diffused polyurethane foam to a desired area to be applied with the polyurethane foam.

Another aspect of the present invention provides an air injection module for a tire, the air injection module including the air injection valve-integrated spray for spraying polyurethane foam for a tire.

Another aspect of the present invention provides an air injection module for a tire, the air injection module including the air injection valve-integrated spray for spraying polyurethane foam for a tire.

Another aspect of the present invention provides a method of using the air injection valve-integrated spray for spraying polyurethane foam for a tire, the method including: coupling the air injection valve-integrated spray for spraying polyurethane foam for a tire to the air injection valve; mounting the air injection valve in a tire; injecting air through the air injection valve; breaking the breaking portion with the injected air; and spraying and applying the polyurethane foam from the polyurethane foam chamber to a desired area to be applied with the polyurethane foam.

BRIEF DESCRIPTION OF THE DRAWINGS

FIG. 4A is a schematic view showing an air delivery chamber and a coupling portion that are separately formed and then combined in a spray for spraying polyurethane foam for a tire according to an embodiment of the present invention;

DETAILED DESCRIPTION OF THE PREFERRED EMBODIMENTS

Figure 1:
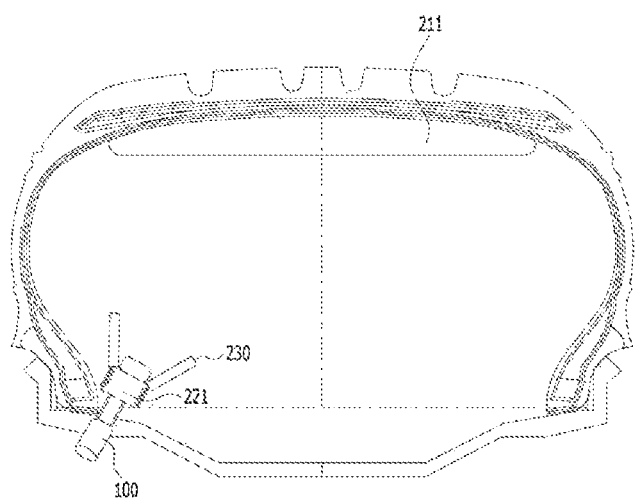
FIG. 1 is a schematic view showing a state with polyurethane foam sprayed on the inner liner of a tire by a spraying for spraying polyurethane foam for a tire according to an embodiment of the present invention.
Figure 2:
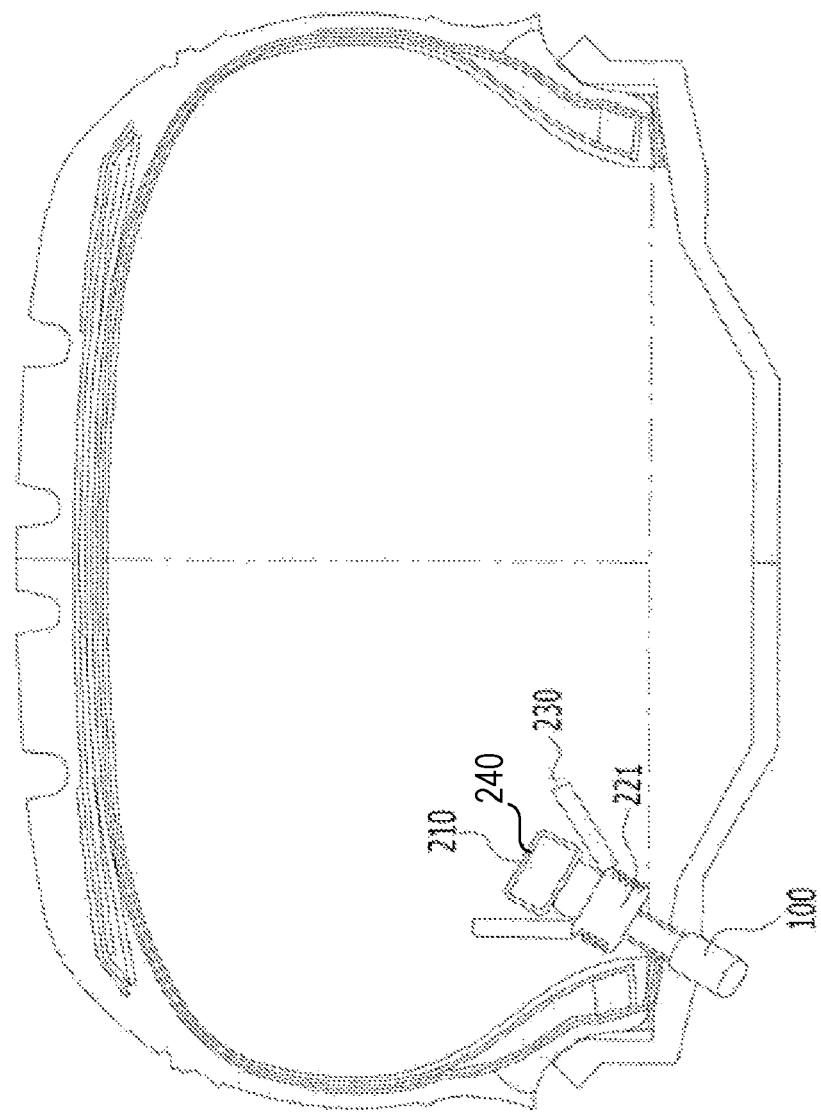
FIG. 2 is a schematic view showing a state when an air injection valve and a spray for polyurethane foam for a tire according to an embodiment of the present invention are combined and mounted on a tire.
Figure 3:
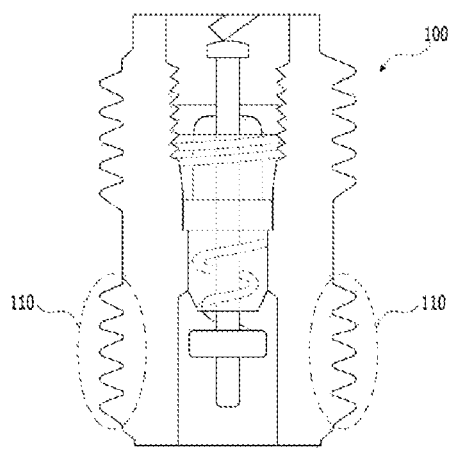
FIG. 3 is a schematic view showing a threaded-structure that is a coupling portion according to an embodiment of the present invention.

The present invention is described hereafter with reference to the accompanying drawings. However, the present invention may be achieved in various different ways and is not limited to the embodiments described herein. In the accompanying drawings, portions not related to the description will be omitted in order to obviously describe the present invention, and similar reference numerals will be used to describe similar portions throughout the present specification.

Throughout this specification, a case in which any one part is connected with (in contact with, coupled to, and combined with) the other part includes a case in which the parts are directly connected with each other and a case in which the parts are indirectly connected with each other with other component interposed therebetween. Further, unless explicitly described otherwise, "comprising" any components will be understood to imply the inclusion of other components rather than the exclusion of any other components.

Terms used in the present specification are used only in order to describe specific exemplary embodiments rather than limiting the present invention. As used herein, the singular forms are intended to include the plural forms as well, unless the context clearly indicates otherwise. It will be further understood that the terms "comprises" or "have" used in this specification, specify the presence of stated features, steps, operations, components, parts, or a combination thereof, but do not preclude the presence or addition of one or more other features, numerals, steps, operations, components, parts, or a combination thereof.

Embodiments of the present invention are described hereafter in detail with reference to the accompanying drawings.

An air injection valve-integrated spray for spraying and applying polyurethane foam to a desired portion of a tire of the present invention includes a polyurethane foam chamber 210 disposed at an end of a coupling portion 221 and keeping polyurethane foam 211 under pressure and an air delivery chamber 220 delivering air injected from an air injection valve 100 to a breaking portion of the polyurethane foam chamber 210, in which the breaking portion of the polyurethane foam chamber 210 is broken by air coming out of the air delivery chamber 220, so the polyurethane foam 211 is sprayed.

According to the embodiment of the present invention shown in FIG. 1, it can be seen that polyurethane foam 211 has been applied to the inner liner of a tire.

The polyurethane foam chamber 210 is filled with polyurethane foam 211 under high pressure. The amount of polyurethane foam 211 to be kept depends on the area and thickness of an acoustic absorbent layer, and for example, about 100 ml may be required to apply polyurethane foam with a width of 200 mm and a thickness of 1 mm for an 18 inch tire. When polyurethane foam 211 having density of 0.357 $g/cm^3$ is used, the weight is 35.7 g, but this weight means that the spray including the polyurethane foam chamber for spraying polyurethane foam to a tire 200 does not act as eccentric weight when the tire is in use.

Polyurethane foam 211 contains a foaming agent, so it expands after being sprayed and stuck to the inner liner of a tire by the spray for spraying polyurethane foam for a tire 200 of the present invention. One-component polyurethane foam 211 that is hardened by humidity of air may be used for the polyurethane foam 211, but the present invention is not limited thereto. Further, the foaming agent may be CFC, but is not limited thereto.

The air injection valve-integrated spray for spraying polyurethane foam for a tire 200 further include a spray guide 230 and the spray guide applies polyurethane foam 211 only to a predetermined portion of a tire. The predetermined portion may be the inner liner of a tire. The spray guide 230 may be one part or may be composed of several plates. When it is one part, it may have a shape that expands as it goes away from the coupling portion 230. The degree of expansion may be a desired angle depending on the specifications of tires and the angle may be defined so that polyurethane foam 211 can be stably applied only to an inner liner in accordance with the length of the inner liner depending on the specifications of a tire. For example, it may have a conical shape, in detail, of which the inlet may have various-shaped cross-section, including a circle, a rectangle, and a pentagon.

The spray guide 230 may be composed of several parts. The parts of the spray guide 230 may maintain a predetermined angle depending on the specifications of tires and the angle may be defined so that polyurethane foam 211 can be stably applied only to an inner liner in accordance with the length of the inner liner depending on the specifications of a tire. Further, in an embodiment of the present invention, the spray guide 230 may be composed of one or more plates and the plates may have a first end coupled and fixed to the polyurethane foam chamber 210 or the air delivery chamber and a second end as a free end. Further, the plates maintain a position for guiding the sprayed and diffused polyurethane foam 211 to a desired area to be applied with the polyurethane foam 211.

When polyurethane foam 211 is applied out of the inner liner, obviously, it is possible to remove the polyurethane foam applied to the undesired portion using a polyurethane foam cleaner.

The air delivery chamber 220 performs a first function that guides the air injected from the air injection valve 100 to the breaking portion of the polyurethane foam chamber 210 and a second function that supports the polyurethane foam chamber 210.

Figure 4B:
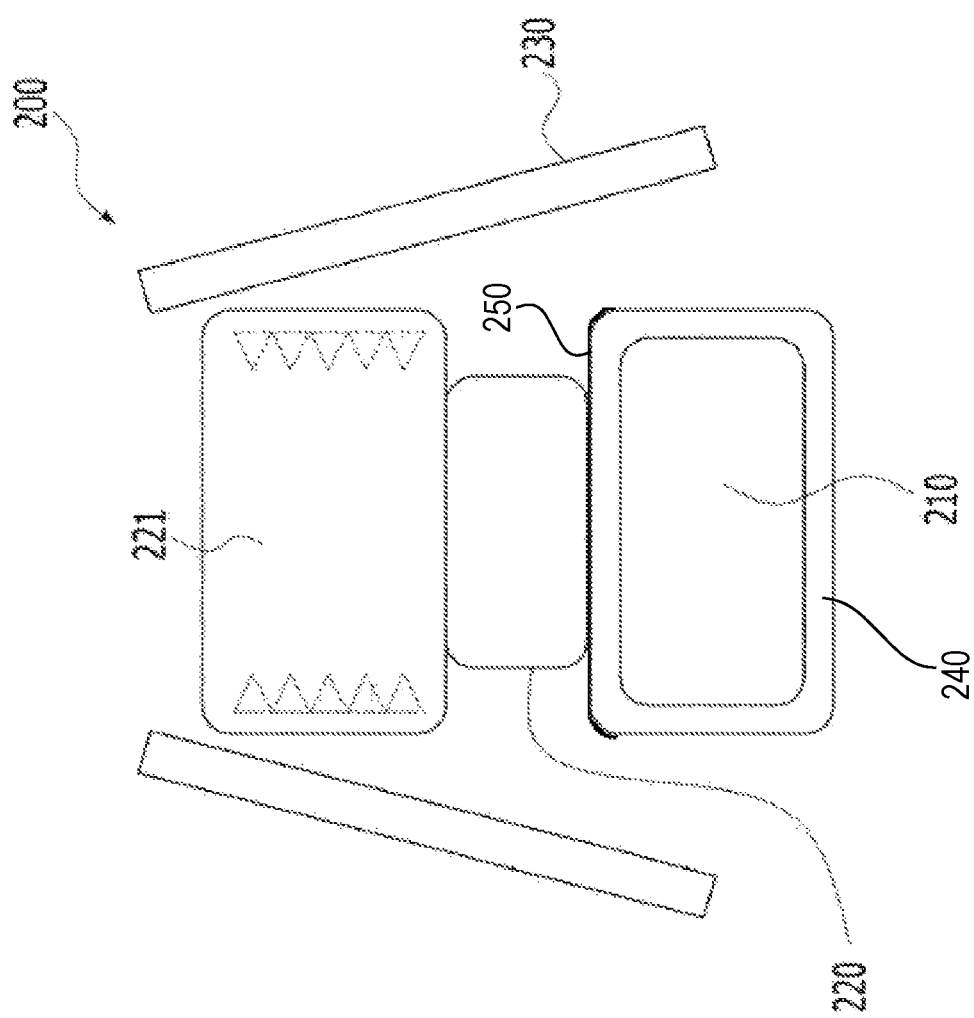
FIG. 4B is a schematic view showing an air delivery chamber and a coupling portion that are separately formed, where the air delivery chamber includes a seat formed in a shape corresponding to the outer shape of the polyurethane foam chamber.
Figure 5:
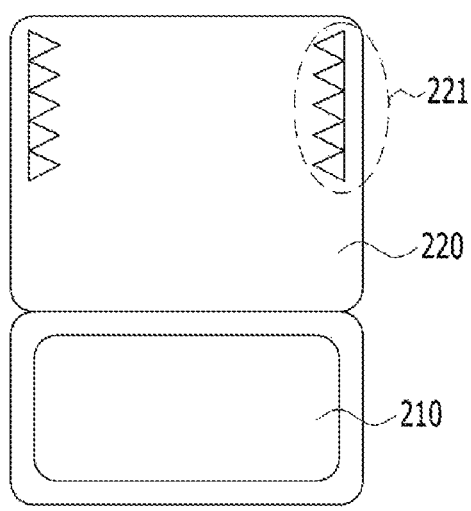
FIG. 5 is a schematic view showing an air delivery chamber and a coupling portion that are integrally formed in a spray for spraying polyurethane foam for a tire according to an embodiment of the present invention.

Further, the air delivery chamber 220 may have a structure (coupling portion 221) for coupling itself to the air injection valve 100. Obviously, the coupling portion 221 and the air delivery chamber 220 may be separately formed and then combined, which can be seen from the embodiment shown in FIG. 4A. The air delivery chamber 220 may have a seat to perform the second function and the seat may be formed in a shape corresponding to outer shape of the polyurethane foam chamber 210, which can be seen from the embodiment shown in FIG. 4B.

The coupling portion 221 has a thread, which corresponds to a thread 110 on the air injection valve 100. Obviously, structures that can couple the air injection valve 100 to the spray for spraying polyurethane foam 211 for a tire 200 other than the thread may be considered for the coupling portion 221. For example, a compressive tube that is fitted on the outer side of the air injection valve under pressure may be considered.

Although the coupling portion 221 may be coupled to the air delivery chamber 220, as described above, the coupling portion 221 may be a specific part separate from the air delivery chamber 220. In this case, the coupling portion 221 may be in connection with the air injection valve 100 and the air delivery chamber 220 may be connected to the coupling portion 221.

Further, the air delivery chamber 220 may be formed in a tube shape. However, the air delivery chamber 220 is not limited to the tube shape and may have various shapes, depending on the use, demands, or manufacturing conditions. In particular, when the air delivery chamber 220 is formed in a tube shape, it considers that air injected from the air injection valve 100 can be delivered to the breaking portion of the polyurethane foam chamber 210 with loss of the air minimized.

Further, according to an embodiment of the present invention, there is provided a method of using the air injection valve-integrated spray for spraying polyurethane foam for a tire 200, the method may including: coupling the air injection valve-integrated spray for spraying polyurethane foam for a tire 200 to the air injection valve 100; mounting the air injection valve 100 in a tire; injecting air through the air injection valve 100; breaking the breaking portion with the injected air; and spraying and applying the polyurethane foam 211 from the polyurethane foam chamber 210 to a desired area to be applied with the polyurethane foam 211.

The method may further include checking and removing polyurethane foam 211 out of the desired area using a cleaner after the polyurethane foam 211 is applied to the desired area to be applied with the polyurethane foam 211.

The above description is an example of the present invention and those skilled in the art may understand that the present invention may be easily modified in other ways without changing the necessary characteristics or the spirit of the present invention. Therefore, it should be understood that the exemplary embodiments are not limiting but illustrative in all aspects. For example, the single components may be divided, respectively, and the separate components may be combined.

The scope of the present invention is defined by the following claims, and all of changes and modifications obtained from the meaning and range of claims and equivalent concepts should be construed as being included in the scope of the present invention.

The present invention provides a first effect of improving cavity noise by forming an acoustic material inside a tire and a second effect of forming an acoustic material layer made of polyurethane foam inside a tire simply and efficiently more than the related art in which an acoustic material is attached to the inner side of a tire, because it install the acoustic material by injecting air. The effects of the present invention are not limited to those described above and should be construed as including all of effect that can be inferred from the configuration of the present invention described in the detailed description or claims.

REFERENCE NUMERALS FROM THE FIGURES

100: Air injection valve
110: Thread on an air injection valve
200: Spray for spraying polyurethane foam to a tire
210: Polyurethane foam chamber
211: Polyurethane foam
220: Air delivery chamber
221: Coupling portion
230: Spray guide

What is claimed is:

1. An air injection valve-integrated spray comprising:
a polyurethane foam chamber containing a polyurethane foam under pressure; and
an air delivery chamber delivering air injected from an air injection valve to a breaking portion of the polyurethane foam chamber; and
a spray guide positioned laterally outward of the polyurethane foam chamber and the air delivery chamber;
wherein the breaking portion of the polyurethane foam chamber is broken by the air delivered by the air delivery chamber, so the polyurethane foam is sprayed,
wherein the spray guide allows the polyurethane foam to be applied to a predetermined portion of a tire, and
wherein the spray guide is composed of one or more plates, the one or more plates respectively have a first end coupled and fixed to the polyurethane foam chamber or the air delivery chamber and a second end as a free end, and the one or more plates are positioned in a manner such that the sprayed and diffused polyurethane foam is guided to the predetermined portion of the tire.

2. The spray of claim 1, wherein the predetermined portion to which the polyurethane foam is applied is an inner liner of the tire.

3. The spray of claim 1, wherein the air delivery chamber has a coupling portion for coupling to the air injection valve.

4. The spray of claim 3, wherein the coupling portion is a thread which corresponds to a thread on the air injection valve.

5. The spray of claim 1, wherein the air delivery chamber is formed in a tube shape.

6. The spray of claim 5, wherein the air delivery chamber has a seat, where the polyurethane foam chamber is seated, at an end of the tube shape.

7. The air injection valve of claim 1, wherein the one or more plates maintain their positions when guiding the sprayed polyurethane foam to the predetermined portion of the tire.

8. An air injection valve-integrated spray, comprising:
a polyurethane foam chamber containing a polyurethane foam under pressure;
an air delivery chamber delivering air injected from an air injection valve to a breaking portion of the polyurethane foam chamber, the air delivery chamber including a seat formed in a shape corresponding to an outer shape of the polyurethane foam chamber and configured to support the polyurethane foam chamber;
a coupling portion coupling the air injection valve and the air delivery chamber; and a spray guide positioned laterally outward of the polyurethane foam chamber and the air delivery chamber, wherein the breaking portion of the polyurethane foam chamber is broken by the air delivered by the air delivery chamber, so the polyurethane foam is sprayed, wherein the spray guide is composed of one or more plates, the one or more plates respectively have a first end coupled and fixed to the polyurethane foam chamber or the air delivery chamber and a second end as a free end, and the one or more plates are positioned in a manner such that the sprayed and diffused polyurethane foam is guided to a predetermined portion of the tire.

9. A tire comprising the air injection valve-integrated spray of claim 1.

10. A method for spraying polyurethane foam to a tire, the method comprising:
   i) coupling the air injection valve-integrated spray of claim 1 to the air injection valve;
   ii) mounting the air injection valve in the tire;
   iii) injecting air through the air injection valve;
   iv) breaking the breaking portion with the injected air; and
   v) spraying and applying the polyurethane foam from the polyurethane foam chamber to the predetermined portion of the tire.

* * * * *